United States Patent
Ström et al.

(10) Patent No.: US 11,932,579 B2
(45) Date of Patent: Mar. 19, 2024

(54) PROCESS FOR MANUFACTURING A CHROMIUM ALLOYED MOLYBDENUM SILICIDE PORTION OF A HEATING ELEMENT

(71) Applicant: KANTHAL AB, Hallstahammar (SE)

(72) Inventors: Erik Ström, Västerås (SE); Maria Ivermark, Västerås (SE)

(73) Assignee: Kanthal AB, Hallstahammar (SE)

( * ) Notice: Subject to any disclaimer, the term of this patent is extended or adjusted under 35 U.S.C. 154(b) by 387 days.

(21) Appl. No.: 17/293,062

(22) PCT Filed: Nov. 15, 2019

(86) PCT No.: PCT/EP2019/081506
§ 371 (c)(1),
(2) Date: May 12, 2021

(87) PCT Pub. No.: WO2020/099644
PCT Pub. Date: May 22, 2020

(65) Prior Publication Data
US 2021/0403386 A1     Dec. 30, 2021

(30) Foreign Application Priority Data
Nov. 16, 2018  (EP) ..................... 18206793

(51) Int. Cl.
*C04B 35/58*     (2006.01)
*C01B 33/06*     (2006.01)
(Continued)

(52) U.S. Cl.
CPC ........ *C04B 35/58092* (2013.01); *C01B 33/06* (2013.01); *C04B 35/6303* (2013.01);
(Continued)

(58) Field of Classification Search
CPC .......... C04B 35/58092; C04B 35/6303; C04B 35/64; C04B 2235/349; C04B 2235/3891;
(Continued)

(56) References Cited

U.S. PATENT DOCUMENTS 2,779,579 A * 1/1957 Steinitz ............... C04B 35/6365
432/252
3,009,886 A * 11/1961 Wejnarth ............ C04B 35/6316
252/512

(Continued)

FOREIGN PATENT DOCUMENTS

JP     H02-111614 A     4/1990
JP     H02111614 A *    4/1990  ............. C01B 33/06
(Continued)

OTHER PUBLICATIONS

International Search Report and Written Opinion dated Dec. 9, 2019, issued in corresponding International Patent Application No. PCT/EP2019/081506.
(Continued)

*Primary Examiner* — Karl E Group
(74) *Attorney, Agent, or Firm* — Morgan, Lewis & Bockius LLP

(57) ABSTRACT

A process of manufacturing a chromium alloyed molybdenum silicide portion of a heating element comprising the steps of: forming a mixture of a chromium powder and a silicon powder; reacting the mixture to a reaction product in an inert atmosphere at a temperature of at least 1100° C. but not more than 1580° C.; converting the reaction product to a powder comprising $CrSi_2$; forming a powder ceramic composition by mixing the powder comprising $CrSi_2$ with a $MoSi_2$ powder and optionally with an extrusion aid; forming the portion of the heating element; and sintering the portion of the heating element in a temperature of from about 1450° C. to about 1700° C.; characterized in that the chromium (Continued)

powder and the silicon powder are provided separately to the mixture.

15 Claims, 1 Drawing Sheet

(51) Int. Cl.
    *C04B 33/06*     (2006.01)
    *C04B 35/63*     (2006.01)
    *C04B 35/64*     (2006.01)
    *H05B 3/14*     (2006.01)

(52) U.S. Cl.
    CPC ............. *C04B 35/64* (2013.01); *H05B 3/141* (2013.01); *C04B 2235/349* (2013.01); *C04B 2235/3891* (2013.01); *C04B 2235/604* (2013.01); *C04B 2235/656* (2013.01); *C04B 2235/661* (2013.01); *H05B 2203/017* (2013.01)

(58) Field of Classification Search
    CPC ........ C04B 2235/656; C04B 2235/661; C01B 33/06
    See application file for complete search history.

(56) References Cited

U.S. PATENT DOCUMENTS

| 3,362,787 | A | * | 1/1968 | Matchen | ................. | C01B 33/06 |
|---|---|---|---|---|---|---|
| | | | | | | 423/344 |
| 7,166,823 | B2 | | 1/2007 | Sundberg et al. | | |
| 2011/0240911 | A1 | | 10/2011 | Sundberg et al. | | |

FOREIGN PATENT DOCUMENTS

| JP | 2011-020920 A | 2/2011 |
|---|---|---|
| JP | 2012-506365 A | 3/2012 |
| WO | 2010/047654 A1 | 4/2010 |
| WO | 2017/108694 A1 | 6/2017 |

OTHER PUBLICATIONS

Office Action dated Aug. 1, 2023, issued in corresponding Japanese Patent Application No. 2021-525631.

Ström et al. in "Low temperature oxidation of Cr-alloyed MoSi2", Transaction of Nonferrous Metals Society of China, 2007: 17(6) 1282-1286.

\* cited by examiner

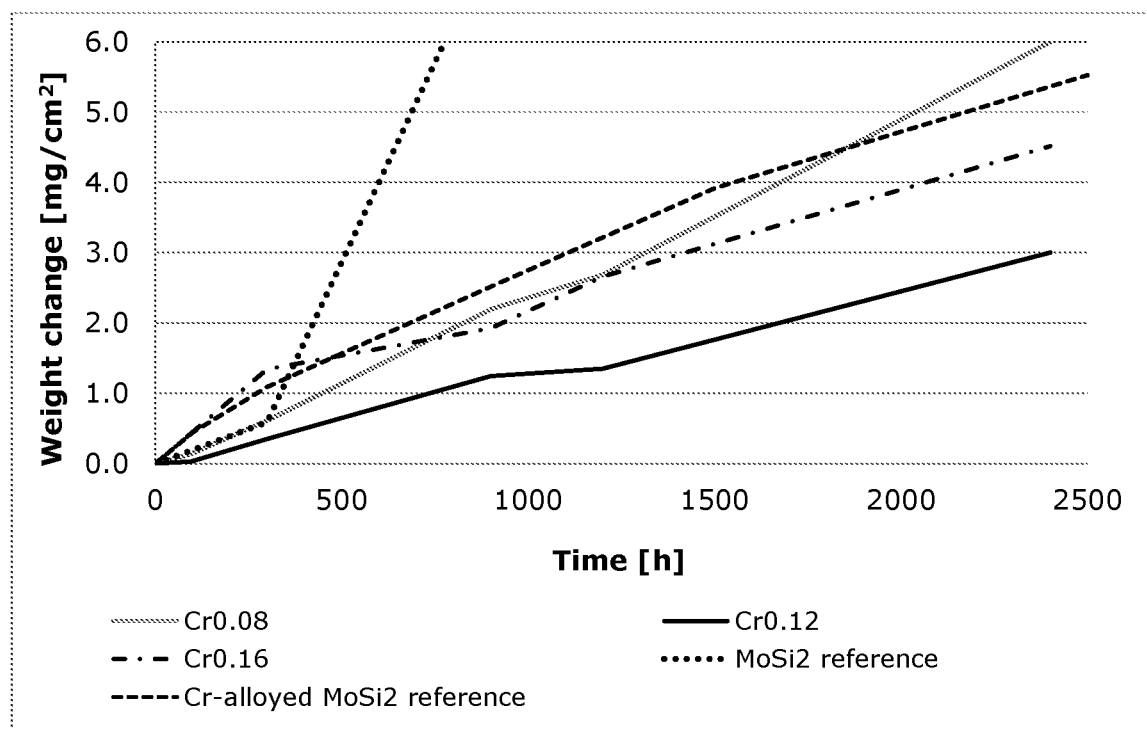

PROCESS FOR MANUFACTURING A CHROMIUM ALLOYED MOLYBDENUM SILICIDE PORTION OF A HEATING ELEMENT

TECHNICAL FIELD

The present disclosure relates to a new process for manufacturing a portion of a heating element, which portion comprises chromium alloyed molybdenum disilicide and the use thereof.

BACKGROUND

Molybdenum disilicide based materials have successfully been used in many demanding high temperature applications, such as in parts in engines, turbines and furnaces. These materials typically exhibit good mechanical properties at high temperatures, up to 1800° C., as well as good corrosion and oxidation resistance in air. This is mainly owing to the formation of a continuous and well-adherent $SiO_2$ layer protecting the molybdenum disilicide.

However, heating of molybdenum disilicide based materials in air also leads to the formation of $MoO_3$ which, especially in the temperature range of 400-600° C., disturbs the formation of a continuous and well-adherent $SiO_2$ layer on the molybdenum disilicide based material. This phenomenon was first described and termed "pesting" by Fitzer in 1955. Since pesting hinders the formation of a protective silica layer, material consumption due to oxidation and corrosion will be both high and continuous where pesting has occurred. In a high temperature application, such as a furnace, at least part of the heating elements used therein will be in the pesting temperature regime.

It has been shown by for example Strom et al. in "Low temperature oxidation of Cr-alloyed $MoSi_2$", Transaction of Nonferrous Metals Society of China, 2007: 17(6) 1282-1286 that chromium alloyed molybdenum disilicide compositions such as $(Mo_{0.90}Cr_{0.10})Si_2$ and $(Mo_{0.85}Cr_{0.15})Si_2$ display an improved resistance towards pesting.

However, there still exists a need for a chromium alloyed molybdenum disilicide heating elements having an improved oxidation resistance.

DETAILED DESCRIPTION

The present disclosure therefore provides a new process for manufacturing a chromium alloyed molybdenum disilicide portion of a heating element. The chromium alloyed molybdenum disilicide portion of a heating element obtained through this process will have an improved oxidation resistance.

The present process comprises the steps of:
forming a mixture of a chromium powder and a silicon powder;
reacting the mixture to a reaction product in an inert atmosphere at a temperature of at least 1100° C. but not more than 1580° C.;
converting the reaction product to a powder comprising $CrSi_2$;
forming a powder ceramic composition by mixing the powder comprising $CrSi_2$ with a $MoSi_2$ powder and optionally with an extrusion aid;
forming the portion of the heating element; and
sintering the portion of the heating element in a temperature of from about 1450° C. to about 1700° C.;
characterized in that the chromium powder and the silicon powder are provided separately to the mixture.

Hence, during this process, the chemical element chromium will not be added to the molybdenum disilicide ($MoSi_2$) powder until the final steps of the manufacturing process. It has surprisingly been shown (see the example) that by adding chromium powder in the last stages of the process, a reduction of the pesting rate in the portion as defined hereinabove or hereinafter will be obtained. Without being bound to any theory, it is believed that effect is due to the homogeneous distribution of the element chromium along the grain boundaries of $MoSi_2$. Furthermore, as an additional advantage, it has been shown that all other important properties of the portion of the heating element will be maintained.

Another advantage with the present process is that the manufacturing of $MoSi_2$ powder and the manufacturing of the powder comprising $CrSi_2$ may be performed using different manufacturing equipment as these powders will be mixed in the final stages of the process, thus chromium contamination of the manufacturing equipment will be reduced.

In the first step, a chromium powder and a silicon powder are added as separate powders to a mixing device and mixed. Examples of mixing devices are different types of mills. The obtained mixture may then be inserted in a furnace which has an inert atmosphere and a temperature of at least 1100° C. but not higher than 1580° C., such as about 1300 to about 1400° C. In the present disclosure, the term "about" means plus or minus 10% of the numerical value of the number with which it is being used.

The mixture will react and form a reaction product comprising of essentially $CrSi_2$ but it may also comprise $CrSi$, $Cr_5Si_3$, $Cr_3Si$ and non-reacted chromium and non-reacted silicon. The levels of these other compounds/elements will be so low that they will not affect the final properties of said portion of the heating element.

The reaction product is converted to a powder composition comprising $CrSi_2$, for example by milling and using a sieve in order to obtain the desire particle size range. The powder composition comprising $CrSi_2$ is then mixed with a $MoSi_2$ powder and optionally with an extrusion aid, whereby a ceramic powder composition is obtained.

According to one embodiment, the extrusion aid is an inorganic clay, such as an aluminum silicate clay. Example of an aluminum silicate clay is Bentolite-L.

According to one embodiment, the obtained ceramic powder composition is formed by extrusion by using an extruder whereby an extruded portion of a heating element is formed. The extruded portion may have the form of a rod. According to the present disclosure, a whole heating element may be formed.

According to one embodiment, the obtained ceramic powder composition is formed by using isostatic pressing process, wherein the isostatic forming process includes the step of:
adding the powder ceramic composition to a capsule which has at least part of the shape of the desired portion of the heating element and
subjecting said capsule to a predetermined pressure at a predetermined temperature for a predetermined time. Example of a predetermined pressure is a pressure about 150 bar to about 250 bar. Example of temperature is room temperature and example of time is about 1 to 30 minutes.

According to one embodiment, a whole heating element may be formed by this method.

After forming, the obtained portion of the heating element is sintered. The obtained portion of the heating element may also be pre-sintered to a brown body. The pre-sintering may be performed in a temperature of about 1400 to about 1600° C. and in an inert atmosphere. Additionally, according to one embodiment, the portion of the heating element may be dried before pre-sintering and/or sintering.

According to one embodiment, the sintered portion of the heating element comprises more than 90 weight % $Mo_{1-x}Cr_xSi_2$, the balance is the extrusion aid and unavoidable impurities. According to another embodiment, x is between 0.08 to 0.15. It has been found that by having x between these numbers, the best pest resistance is obtained in the portion of the heating element.

The present disclosure also relates to a heating element comprising or consisting of the chromium alloyed molybdenum silicide portion which has been manufactured according to the process as defined hereinabove or hereinafter. According to one embodiment, the heating element may comprise more than one portion as defined hereinabove or hereinafter.

The present disclosure also relates to a use of the process as defined hereinabove or hereinafter for manufacturing a heating element.

BRIEF DESCRIPTION OF THE DRAWINGS

The figure shows the weight change during air exposure at 450° C.

The disclosure is further illustrated by the following non-limiting illustrative examples.

The disclosure is further illustrated by the following non-limiting illustrative examples.

EXAMPLE

A chromium powder and a silicon powder were mixed, and the mixture was reacted in argon atmosphere to form $CrSi_2$ and analyzed by x-ray diffraction (XRD). The obtained powder, which was obtained through milling, contained mostly $CrSi_2$, a small fraction of CrSi and indications of elemental Si and Cr. A $CrSi_2$ powder and was then mixed with a production charge of $MoSi_2$ powder according to specified stoichiometric compositions, and 4 to 6 wt % Bentolite-L was used as binder phase (extrusion aid) and petrol in a ball mill. The ceramic paste was extruded into 6 mm diameter rods, which were subsequently dried and pre-sintered and then sintered in inert atmosphere, using for example as hydrogen or argon, in temperatures of 1000° C. to 1520° C. until a dense material is obtained. The resulting material contained $Mo_{1-x}Cr_xSi_2$, where x=0.08, 0.12, 0.14 and 0.16, equivalent to 2.7, 4.1, 4.9 and 5.4 at % Cr, respectively. A reference material made from purchased $CrSi_2$ powder, with a final composition of x=0.13, equivalent of 4.3 at % Cr was also prepared. Samples of each composition were ground to remove the protective $SiO_2$ scale that was formed during final sintering. Samples were placed individually on alumina sample holders to collect potential oxidation products and include them in the weight measurements. The samples were placed in laboratory air in an electrical furnace heated to 450° C. employing FeCrAl heating elements and utilized with ceramic fiber insulation. Sample and holder were weighted to monitor individual weight changes as function of exposure time. For the two reference materials, $MoSi_2$ reference and Cr-alloyed $MoSi_2$ reference, data were taken from other pest tests. The resulting data is presented in the FIGURE below:

The figure shows that all Cr-alloyed materials performed substantially better than the reference MoSi2-based material KS1700 and better in comparison to previous experience of Cr-alloyed material. Cr0.14 equivalent to 4.9 at% Cr (orange) appeared to have an ideal composition with respect to resistance against pesting.

The material was also evaluated by SEM-EDS with respect to phase distribution and oxide thickness. In comparison to the reference $Cr_{0.15}$ material the distribution of Cr seems to be slightly different. In the case of reference $Cr_{0.15}$, which was made from elemental Mo, Si and Cr, Cr was concentrated to certain areas unevenly distributed in the cross section of the material. In the case of material alloyed by sintering $MoSi_2$ and $CrSi_2$, Cr was more homogeneously distributed along the grain boundaries of $MoSi_2$, either as tetragonal $(Mo,Cr)_5Si_3$ ($D8_m$) phase or as hexagonal $(Mo,Cr)Si_2$ (C40) phase. Hence, EDS showed that Cr distribution was concentrated to certain grain boundaries in case of reference $Cr_{0.15}$ made from elemental powders while homogeneous distribution of Cr along grain boundaries of $MoSi_2$ was found in $Cr_{0.14}$ made from $CrSi_2$ and $MoSi_2$ powders.

The invention claimed is:

1. A process of manufacturing a chromium alloyed molybdenum silicide portion of a heating element comprising the steps of:
   forming a mixture of a chromium powder and a silicon powder;
   reacting the mixture to a reaction product in an inert atmosphere at a temperature of at least 1100° C. but not more than 1580° C.;
   converting the reaction product to a powder comprising $CrSi_2$;
   forming a powder ceramic composition by mixing the powder comprising $CrSi_2$ with a $MoSi_2$ powder;
   forming the portion of the heating element; and
   sintering the portion of the heating element in a temperature of from about 1450° C. to about 1700° C.;
   wherein the chromium powder and the silicon powder are provided separately to the mixture, and
   wherein the forming step comprises subjecting the ceramic powder composition to an isostatic forming pressing process wherein said process comprises the step of:
   adding the ceramic powder composition to a capsule which has at least part of the shape of the desired object; and
   subjecting said capsule to a predetermined pressure at a predetermined temperature for a predetermined time.

2. The process according to claim 1, wherein the portion of the heating element is pre-sintered before sintering.

3. The process according to claim 2, wherein the pre-sintering step is performed in inert atmosphere at a temperature of from about 1400° C. to about 1600° C.

4. The process according to claim 1, wherein the sintered portion of the heating element comprises more than 90 weight % $Mo_{1-x}Cr_xSi_2$ and the balance is extrusion aid and unavoidable impurities.

5. The process according to claim 4, wherein x is between 0.08 to 0.15.

6. A process of manufacturing a chromium alloyed molybdenum silicide portion of a heating element comprising the steps of:
   forming a mixture of a chromium powder and a silicon powder;
   reacting the mixture to a reaction product in an inert atmosphere at a temperature of at least 1100° C. but not more than 1580° C.;

converting the reaction product to a powder comprising $CrSi_2$;

forming a powder ceramic composition by mixing the powder comprising $CrSi_2$ with a $MoSi_2$ powder and an extrusion aid;

forming the portion of the heating element; and sintering the portion of the heating element in a temperature of from about 1450° C. to about 1700° C.;

wherein the chromium powder and the silicon powder are provided separately to the mixture, and wherein the extrusion aid is an inorganic clay.

7. The process according to claim 6, wherein the inorganic clay is an aluminum silicate clay.

8. A process of manufacturing a chromium alloyed molybdenum silicide portion of a heating element comprising the steps of:

forming a mixture of a chromium powder and a silicon powder;

reacting the mixture to a reaction product in an inert atmosphere at a temperature of at least 1100° C. but not more than 1580° C.;

converting the reaction product to a powder comprising $CrSi_2$;

forming a powder ceramic composition by mixing the powder comprising $CrSi_2$ with a $MoSi_2$ powder and optionally with an extrusion aid;

forming the portion of the heating element; and sintering the portion of the heating element in a temperature of from about 1450° C. to about 1700° C.;

wherein the chromium powder and the silicon powder are provided separately to the mixture, wherein the sintered portion of the heating element comprises more than 90 weight % $Mo_{1-x}Cr_xSi_2$ and the balance is extrusion aid and unavoidable impurities, and wherein x is between 0.08 to 0.15.

9. The process according to claim 8, wherein the portion of the heating element is pre-sintered before sintering.

10. The process according to claim 9, wherein the pre-sintering step is performed in inert atmosphere at a temperature of from about 1400° C. to about 1600° C.

11. The process according to claim 8, wherein the extrusion aid is an inorganic clay.

12. The process according to claim 11, wherein the inorganic clay is an aluminum silicate clay.

13. The process according to claim 8, wherein the portion of the heating element is pre-sintered before sintering in inert atmosphere at a temperature of from about 1400° C. to about 1600° C., and wherein the extrusion aid is an aluminum silicate clay.

14. The process according to claim 6, wherein the portion of the heating element is pre-sintered before sintering.

15. The process according to claim 14, wherein the pre-sintering step is performed in inert atmosphere at a temperature of from about 1400° C. to about 1600° C.

* * * * *